United States Patent [19]

Peeples

[11] 4,230,018
[45] Oct. 28, 1980

[54] HYDRAULIC BOOSTER WITH ACCUMULATOR CONTROL

[75] Inventor: Denny L. Peeples, Dayton, Ohio

[73] Assignee: General Motors Corporation, Detroit, Mich.

[21] Appl. No.: 13,879

[22] Filed: Feb. 22, 1979

[51] Int. Cl.³ .................. F01B 25/02; F15B 20/00
[52] U.S. Cl. ................................ 91/6; 91/5; 91/49; 91/431
[58] Field of Search .............. 91/6, 31, 5, 431, 49

[56] References Cited

U.S. PATENT DOCUMENTS

| 3,353,451 | 11/1967 | Garrison et al. | 91/431 |
| 3,638,528 | 2/1972 | Lewis | 91/6 |
| 4,135,435 | 1/1979 | Adachi | 91/431 |

Primary Examiner—Paul E. Maslousky
Attorney, Agent, or Firm—D. D. McGraw

[57] ABSTRACT

A hydraulic power brake system in which a hydraulic power brake booster has an accumulator operable when there is insufficient power to operate the power brake with hydraulic pressure. The accumulator control valve is actuated by a cylindrical cam normally radially displaced so that its axis is not coincident with the axis of the booster. Sufficient actuating movement of the control portions of the booster cause the cam to move axially and radially so that its axis moves in a direction to be coincident with the axis of the booster, causing the accumulator control valve to be opened in a controlled manner and admit accumulator pressure to the booster power chamber.

1 Claim, 2 Drawing Figures

U.S. Patent     Oct. 28, 1980     4,230,018

HYDRAULIC BOOSTER WITH ACCUMULATOR CONTROL

The invention relates to a hydraulic booster having a hydraulic accumulator, and more particularly to one in which the accumulator is actuated to supply pressure in a controlled manner to the booster when the pressure from the primary pressure source is not available. A sleeve is provided around the power piston which will move upon power pressure runout of the booster and cause the accumulator pressure control valve to open and admit accumulator pressure to the booster power pressure chamber to actuate the booster. The sleeve is a cylindrical cam which acts on a cam ramp to be moved radially to move a valve plunger controlling the opening of the accumulator pressure control valve.

Figure 1:
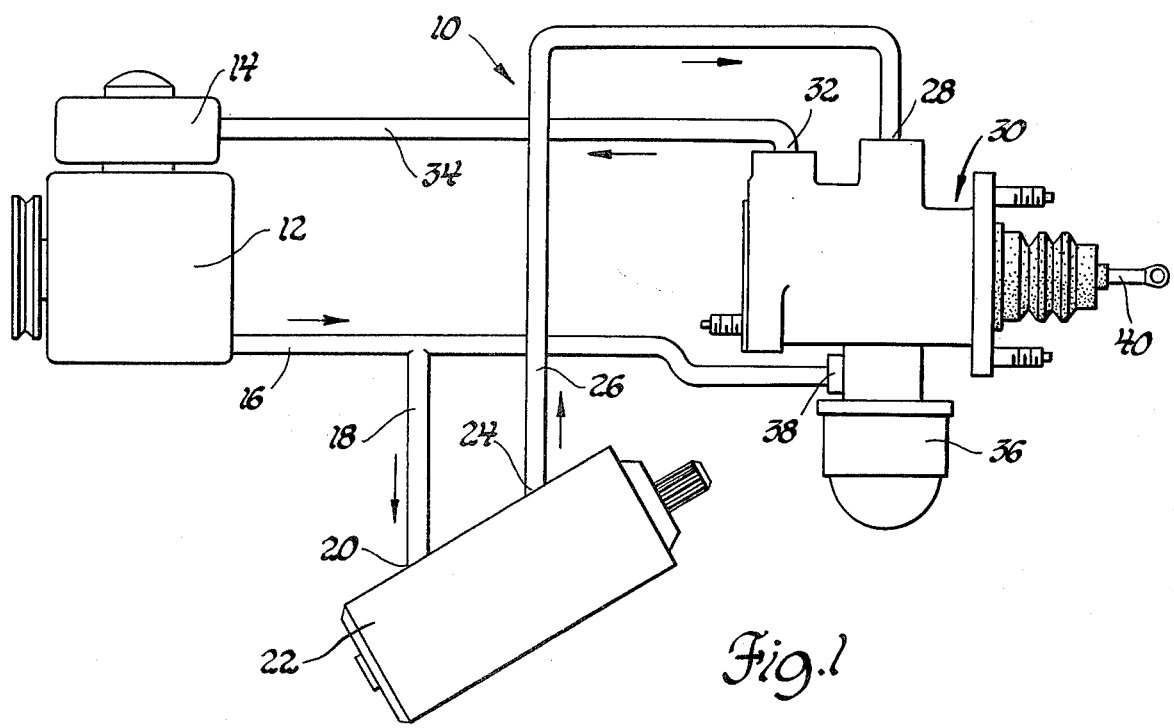
Figure 2:
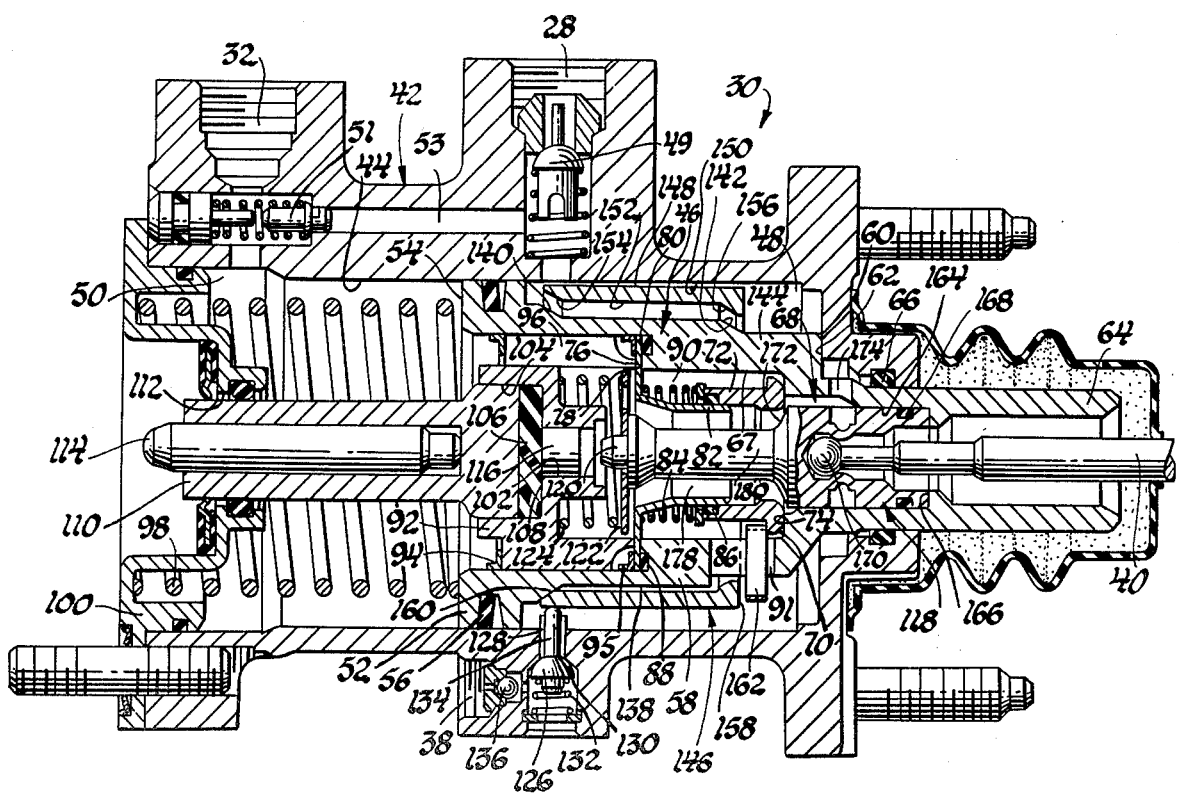

In the drawings, FIG. 1 is a schematic representation of the hydraulic system incorporating a hydraulic brake booster embodying the invention, and FIG. 2 is a cross sectional view of the hydraulic booster of FIG. 1 embodying the invention.

The hydraulic system 10 of FIG. 1 is illustrated as being a power steering gear and hydraulic brake booster system of the type utilized in automotive vehicles. The system includes a hydraulic pump 12 having a reservoir 14. The pump outlet conduit 16 has a conduit branch 18 connected to the inlet 20 of the power steering gear 22. The power steering gear outlet 24 is connected by conduit 26 to the inlet 28 of the hydraulic brake booster 30. The booster outlet 32 is connected by return conduit 34 to the pump reservoir 14. Booster 30 is provided with an accumulator 36 having an inlet 38 to which conduit 16 is also connected. Hydraulic fluid discharged from the pump 12 is therefore provided to the accumulator inlet 38 as well as to the power steering gear inlet 20. Booster 30 is arranged to be operated by movement of an input push rod 40 in a suitable well-known manner such as being connected to a brake pedal for operation by a vehicle operator. The booster is arranged to operate a master cylinder assembly, not shown, so that when the master cylinder is actuated through the booster the vehicle brake system is pressurized and the vehicle brakes are energized.

The booster 30 is illustrated in greater detail in FIG. 2. The booster has a housing 42 provided with a bore 44 extending through the housing. A power piston 46 is reciprocably and sealingly received in a portion of bore 44 to divide that bore into several chambers. A power chamber 48 is located in the bore at one end of power piston 46 and an exhaust chamber 50 is located in the bore at the other end of the power piston 46. Inlet 28 opens into power chamber 48 through inlet check valve 49. Outlet 32 conducts fluid from exhaust chamber 50. A pressure relief valve 51 in passage 53 interconnecting inlet 28 and outlet 32 limits the pressure that can be provided at inlet 28. Power piston 46 has a land 52 at its forward end 54. Land 52 is provided with a seal 56 to seal the piston relative to the bore wall. The piston 46 has a first reduced diameter portion 58 extending rearwardly from land 52 to a shoulder 60 which abuts a wall 62 formed by a shoulder in a part of bore 44 and defining the rear wall of power pressure chamber 48. Piston 46 has a further reduced diameter portion 64 extending through wall 62 in bore 44. Seal 66 in that portion of bore 44 seals against the outer surface of piston portion 64 while allowing the piston to move axially. Power piston 46 has a bore 67 extending axially therethrough and providing fluid communication between power chamber 48 and exhaust chamber 50. An open center control valve 68 is provided in the end of bore 67 opening to power chamber 48. Valve 68 provides for control of the booster in its power operation. A valve seat 70 is mounted in bore 67 and forms a part of valve 68. A sleeve 72 is reciprocably mounted in bore 66 within piston 46 and has one end formed to define valve seat 70. The valve seat normally is in engagement with a shoulder 74 formed within bore 66 at the bore end adjacent power chamber 48. A spring seat and guide 76 is mountead within bore 66 and is seated against a shouler 78 formed in the bore. Seat and guide 76 has a radially extending flange section 80 engaging shoulder 78 for this purpose. It also has a short cylindrical section 82 extending within a smaller diameter portion of bore 67 toward valve seat 70 so that sleeve 72 is guided thereon in axial movement. A compression spring 84 acts on sleeve 72 and takes reaction on the spring seat and guide 76 to continually urge sleeve 72 and valve seat 70 toward shoulder 74. Suitable seals 86 and 88 are provided between seat and guide 76, sleeve 72, and a portion of the piston 46 so that the chamber 90 is sealed from the exhaust chamber 50. Chamber 90 contains sleeve 72, spring 84 and spring seat and guide cylindrical portion 82. It is connected to the power chamber 48 through the opening 91 in power piston 46. The bore 67 of the power piston 46 has an enlarged forward end containing a reaction housing 92 held in place by a suitable retainer 94. Housing 92 has its rear end abutting seat and guide flange 80, holding the seat and guide 76 in axial position. A retainer 95 also holds the seat and guide 76 in position against shoulder 78. A passage 96 extending through the housing 92 forms a part of the exhaust chamber 50. A piston return spring 98 is contained in exhaust chamber 50 and urges the power piston toward the power chamber 48. The forward end of bore 44 is closed by an end wall and spring seat 100, against which spring 98 is seated. Reaction housing 92 has a bore 102 extending axially therethrough, with the forward, larger bore portion 104 having a reaction disc 106 received therein and abutting the bore shoulder 108. A reaction plunger 110 is contained in bore portion 104 and extends forwardly and out of the power piston 46. The rear surface of plunger 110 engages the entire forward surface of reaction disc 106. Plunger 110 extends through a sealed opening 112 formed axially in the end wall 100 and also contains an output member 114 which is arranged to actuate the master cylinder assembly, not shown. The portion of bore 102 rearwardly of shoulder 108 is of smaller diameter than bore portion 104. A reaction piston 116 is reciprocably mounted in this bore portion and has a forward surface engageable with the center part of the rearward surface of the reaction disc 106. An input valve member 118, to be described in greater detail below, extends through the valve seat 70 and sleeve 72. The input valve member output end 120 extends into the rear portion of bore 102 so that it is engageable with reaction piston 116. A spring seat 122 is positioned on a shoulder formed on the input valve member 118 adjacent to but rearwardly of its output end 120, and provides a seat for a spring 124 which takes reaction on the rearward side of reaction housing 92. Spring 124 therefore continually urges the input valve member 118 rearwardly or rightwardly as seen in FIG. 2.

An accumulator control valve 126 is positioned in a passage 128 formed in housing 42 so that the passage extends radially inwardly into the forward portion of chamber 48 near power piston land 52. A valve seat 130 is provided for valve 126 in passage 128, and the valve is spring-loaded by spring 132 to normally engage its seat. Accumulator pressure will act on the valve 126 to assist in keeping the valve closed against its seat. Valve 126 has a valve operating plunger 134 extending through passage 128 and into chamber 48 and having radial clearance relative to the passage wall so as to permit fluid flow through passage 128 past plunger 134. The accumulator charging pressure inlet 38 has a check valve 136 therein which will open to admit pressure from pump 12 only when the pump output pressure is sufficient to open check valve 136 against the pressure in the accumulator. Check valve 136 will close to prevent hydraulic fluid from flowing from the accumulator outwardly through inlet 38.

The power piston reduced diameter portion 58 has a cylindrical outer surface 138 with an outer peripheral annular ramp 140 at the surface forward end adjacent land 52 and another outer peripheral annular ramp 142 at the surface rear end. Ramp 142 adjoins another power piston reduced diameter portion 144 of somewhat smaller diameter than portion 158 and connecting ramp 142 and shoulder 60. A cylindrical cam 146 is received about power piston portion 58 and ramps 140 and 142. Cam 146 has an outer peripheral surface 148 of lesser diameter than the bore section 150 of bore 44 in which piston land 52 is received and of which power pressure chamber 48 forms a part. Cam 146 has an inner peripheral surface 152 of greater diameter than the part of power piston portion 58 that is between ramps 140 and 142. The cam surface 152 terminates at its forward end with an outwardly inclined inner peripheral ramp 154 which is positioned radially outward of ramp 140 and is mateable therewith. The rear end of cam surface 152 terminates with an inwardly inclined inner peripheral ramp 156 which is positioned radially outward of ramp 142 and is mateable therewith. The rear end of cam 146 has an annular end surface 158.

Cam 146 can move radially relative to power piston 46 so as to have its cam axis parallel to but spaced from the power piston axis. Cam 146 can also move axially relative to power piston 46. Accumulator pressure control valve plunger 134 is spring loaded into engagement with the cam outer surface 148 by the force of spring 132 so that the cam is urged radially toward displacement of its axis from the axis of power piston 46, as shown in FIG. 2. This causes point or line engagement of the mateable surfaces of ramps 140 and 154, as shown at 160, and of the mateable surfaces of ramps 142 and 156. The camming action of these ramps insures that cam 146 has moved rearwardly and radially relative to power piston 46 so that the piston surface 138 and cam surface 152 are at least close together, and may be in engagement, along an axially extending line of close approach located on the same circumferential portion of the cam 146 as the location of point or line engagement of the ramps. This is illustrated at the bottom portions of piston 46 and cam 146 in FIG. 2. It occurs in line with the point of engagement of cam 146 and plunger 134, particularly when plunger 134 extends radially towards the axis of the power piston 46. This causes the diametrically opposite sides of cam 146, piston surface 138, and ramps 140, 142, 154 and 156 to be radially spaced apart for a substantial distance as illustrated at the top portions of piston 46 and cam 146 in FIG. 2. A pin 162 extends through piston opening 91 and is secured to valve seat sleeve 72 so as to be axially movable therewith in opening 91. Pin 162 is engageable with cam end surface 158.

The input valve member 118 is reciprocably received in bore section 164 of bore 67 of power piston 46. A suitable stop 166 is provided to determine the released position of member 118, as shown in FIG. 2. A seal 168 on the rear part of member 118 seals with the wall of bore section 164. Member 118 has a ball and socket connection 170 with input push rod 40 so that the member 118 may be moved by the push rod. A valve input element 172 formed on an outer peripheral part of member 118 provides a part of booster control valve 68 and cooperates with valve seat element 70. One or more cross passages 174 in power piston 46 located axially between shoulders 60 and seal 66, and a short axial passage 176, conduct hydraulic fluid to valve 68 and are a part of power chamber 48. Annular passage 178, formed by sleeve 72 and spring seat and guide 76 and the portion 180 of member 118 forward of valve of input element 172, opens into passage 96 and exhaust chamber 60, effectively forming a part of that exhaust chamber.

In the booster released position illustrated in FIG. 2, pump 12 circulates hydraulic fluid through the power steering gear 22 and the booster 30, returning the fluid to the pump reservoir 14 with little pressure in the system. When the power steering gear 22 is actuated a back pressure is generated in conduit 16 and conduit branch 18 so that the pump 12 generates hydraulic pressure. This pressure is also transmitted to the accumulator inlet 38 and opens the check valve 136 to charge the accumulator with pressure. Thus the accumulator 36 may be charged by operation of the power steering gear 22.

When the pump 12 is circulating low pressure hydraulic fluid through the system and the brake booster is actuated to operate the vehicle brakes, input push rod 40 is moved leftwardly as seen in the drawing by the vehicle operator through a brake pedal, not shown. This causes input member 118 to move forwardly, and valve input element 172 approaches and may engage valve seat element 70. This restricts or closes the hydraulic fluid flow path between power pressure chamber 48 and exhaust chamber 50, causing a back pressure to be generated in power pressure chamber 48. This pressure is normally provided by pump 12. The pressure may also act on the accumulator pressure control valve of 126 to open that valve against spring 132 to charge the accumulator with pressure if the accumulator is not already charged to that extent. It will be noted that the amount of pressure capable of being generated in power pressure chamber 48 is limited by action of the pressure relief valve 51, which opens to bypass fluid from inlet 28 to outlet 32 when a predetermined pressure value has been reached in chamber 48. The power pressure in chamber 48 acts against the rear side of the power piston 46, moving that piston leftwardly against the force of piston return spring 98, and also acting through the reaction housing 92, reaction disc 106, reaction plunger 110 and output member 114 to drive the master cylinder, not shown. The forward end 120 of member 118 also engages reaction piston 116 so as to receive a reaction force from the reaction disc 106 and transmit it to the vehicle operator through the push rod 40 and brake pedal.

If the booster reaches power runout, or if for some reason pump 12 does not provide sufficient pressure to supply the power demanded by the vehicle operator input member 118 is moved forwardly with valve input element 172 engaging valve seat element 70 and moving the valve seat sleeve 72 leftwardly against the force of spring 84. The leftward movement of sleeve 72 is accompanied by leftward movement of valve seat pin 162. Thus, the leftward movement of member 118 is transmitted to the cylindrical cam 146 since pin 162 is in engagement with cam end 158. Leftward movement of cam 146 causes its inner peripheral cam ramps to ride up on the outer peripheral cam ramps of the power piston, causing the cylindrical cam 146 to be moved in a radially displaced manner so that its axis tends to become coincident with the axis of the power piston 46. This results in movement of plunger 134 outwardly to open the accumulator pressure control valve 126, controllably admitting accumulator pressure from the interior of the accumulator 36 through accumulator pressure port 128 and into the power chamber 48. Thus, the brake booster is actuated by accumulator pressure under control of the vehicle operator.

Should further master cylinder actuation be required after accumulator pressure is used up, further leftward movement of the input push rod 40 an input member 118 will cause a mechanical drive path to be set up through the input member portion 180 and the reaction housing 92 to the reaction plunger 110 through disc 106 and therefore to the output member 114 and the master cylinder.

When the booster is returned to the released position after the accumulator pressure has been utilized by actuation of control valve 126, the force of spring 132 acting through valve 126 and its plunger 134 will act on the cylindrical cam 146 to cause it to move axially rearwardly and in a radial displacement manner so that its axis is again displaced relative to the axis of the power piston 46. This is the position shown in FIG. 2. So long as the cam 146 is not forced leftwardly, it will remain in this position relative to power piston 46 and accumulator pressure control valve 126 will remain closed except when it may open for accumulator charging.

The embodiments of the invention in which an exclusive property or privilege is claimed are defined as follows:

1. In a hydraulic power booster having an axially movable power piston with a power pressure chamber on one side, a booster control valve for controlling pressure actuation of said booster and having a manually movable valve input element and a valve seat element, said input element being moved relative to said seat element for booster actuation, the improvement comprising:

a hydraulic pressure accumulator having a pressure port fluidly connected to said power pressure chamber, a normally closed spring loaded accumulator pressure control valve in said pressure port having a plunger portion extending into said power pressure chamber generally perpendicular to the axis of the power piston, said power piston having a reduced diameter portion extending axially in said power pressure chamber and formed with outer peripheral cam ramp means coaxial with the power piston, and a cylindrical cam mounted radially over said power piston portion with limited radial and axial clearance relative to said power piston and having inner peripheral cam ramp means mateable with said outer peripheral cam ramp means, said valve plunger engaging the outer peripheral wall of said cylindrical cam and normally holding said cylindrical cam in radially offset relation to said power piston portion with only a small peripheral part of said inner and outer peripheral camp ramp means engaged;

said valve input element being movable to drive said valve seat element to enage and drive said cylindrical cam axially relative to said power piston upon demand for booster operation by accumulator pressure, causing said inner and outer peripheral cam ramp means to move said cylindrical cam radially toward a position coaxial with said power piston and driving said valve plunger to open said normally closed spring loaded accumulator pressure control valve and controllably admit accumulator pressure through said port into said power pressure chamber to power actuate said booster by accumulator pressure.

* * * * *